(12) United States Patent
Kim (10) Patent No.: US 7,898,568 B2
(45) Date of Patent: Mar. 1, 2011

(54) IMAGE DISPLAY SYSTEM

(75) Inventor: Sung Kyu Kim, Seoul (KR)

(73) Assignee: Korea Institute of Science and Technology (KR)

( * ) Notice: Subject to any disclaimer, the term of this patent is extended or adjusted under 35 U.S.C. 154(b) by 1063 days.

(21) Appl. No.: 11/586,822

(22) Filed: Oct. 26, 2006

(65) Prior Publication Data

US 2008/0123173 A1     May 29, 2008

(30) Foreign Application Priority Data

Sep. 14, 2006    (KR)  ............ 10-2006-0089063

(51) Int. Cl.
*H04N 13/04*     (2006.01)
*H04N 15/00*     (2006.01)
*H04N 9/47*     (2006.01)

(52) U.S. Cl. ............ 348/57; 353/7; 353/8; 348/58; 359/464; 359/465

(58) Field of Classification Search .......... 353/7, 353/8; 348/57, 58; 349/15; 359/464, 465
See application file for complete search history.

(56) References Cited

U.S. PATENT DOCUMENTS 5,638,082 A * 6/1997 Grimm .................. 345/6

(Continued)

FOREIGN PATENT DOCUMENTS

| JP | 07-043666 | 2/1995 |
|---|---|---|
| JP | 09-113862 | 5/1997 |
| JP | 2006-119545 | 5/2006 |
| KR | 1020020071541 | 9/2002 |

(Continued)

OTHER PUBLICATIONS

Paul Kleinberger, et al., "A full-time, full-resolution dual stereoscopic/autostereoscopic display or Rock Solid 3D on a flat screen-with glasses or without!", SPIE vol. 5006 Stereoscopic Displays and Virtual Reality Systems X, 2003, 9 pages.

*Primary Examiner*—Georgia Y Epps
*Assistant Examiner*—Bao-Luan Le
(74) *Attorney, Agent, or Firm*—Ohlandt, Greeley, Ruggiero & Perle, LLP (57) ABSTRACT

Disclosed is a display system capable of providing two and three-dimensional images. The display system comprises display means; a first polarizer located at a distance from a front surface of the display means; a display panel provided to a front of the first polarizer and regulating a polarization direction of light having passed through the first polarizer; and a second polarizer located at a distance from a front surface of the display panel, wherein each pixel of the second polarizer has a size of dividing a unit pixel of the display panel into two parts and two polarization states of each pixel are orthogonal to each other. By applying the structure, it is possible to manufacture a display system having a resolution increased by two times, as compared to a conventional display system. Accordingly, when developing a high resolution image display system requiring enormous development costs, it is possible to manufacture it using the two types of display systems. As a result, it is possible to inexpensively manufacture a high resolution and high definition display system. Further, it is possible to provide a three-dimensional image without decreasing the resolution of the display system, and to provide the multi-view points twice as many as the conventional multi-view points, without decreasing the unit view point resolution of the three-dimensional image.

6 Claims, 5 Drawing Sheets

U.S. PATENT DOCUMENTS

| | | | |
|---|---|---|---|
| 6,094,216 A * | 7/2000 | Taniguchi et al. | 348/51 |
| 6,593,959 B1 * | 7/2003 | Kim et al. | 348/57 |
| 2002/0085280 A1 * | 7/2002 | Jung | 359/465 |
| 2004/0008251 A1 * | 1/2004 | Mashitani et al. | 348/51 |
| 2005/0264716 A1 * | 12/2005 | Kim et al. | 349/61 |
| 2006/0126177 A1 * | 6/2006 | Kim et al. | 359/465 |
| 2006/0227256 A1 * | 10/2006 | Hamagishi et al. | 349/15 |

FOREIGN PATENT DOCUMENTS

| | | |
|---|---|---|
| KR | 1020020084301 | 11/2002 |
| WO | 2005/069269 A1 | 7/2005 |

\* cited by examiner

FIG. 1

(PRIOR ART)

IMAGE DISPLAY SYSTEM

CROSS-REFERENCE TO RELATED APPLICATIONS

This application claims all benefits of Korean Patent Application No. 2006-89063 filed on Sep. 14, 2006 in the Korean Intellectual Property Office, the disclosures of which are incorporated herein by reference.

BACKGROUND OF THE INVENTION

1. Field of the Invention

The present invention relates to a general display system and a three-dimensional image display system. More specifically, the invention relates to an image display system for embodying a three-dimensional image with a polarization state of a polarizer and improving a display resolution.

2. Description of the Prior Art

In general, a three-dimensional image is realized by a stereo vision principle through two eyes. At this time, a binocular parallax, which is caused because the eyes are located at a distance of about 65 mm, most influences a three-dimensional effect. A three-dimensional image display system includes a stereoscopic display system and an autostereoscopic display system. The latter obtains a three-dimensional image by dividing right and left images without using the glasses. The autostereoscopic manner includes a parallax barrier manner and a lenticular manner.

According to the parallax barrier manner, images to be seen by both eyes are alternately printed in a pattern of vertical stripes or printed out and then seen using extremely thin vertical lattice columns, i.e., barriers. By doing so, the vertical stripe image to be incident on the left eye and the vertical stripe image to be incident on the right eye are distributed by the barrier, so that the left and right eyes see the images of different view points, thereby seeing a three-dimensional image.

For example, a projective type image display system enlarges an image, which is formed in a display device, through a projective lens unit to project it on a screen and realizes a three-dimensional image with a right and left eyes-image dividing unit provided to the screen.

In a conventional flat display system using a polarization principle, such as liquid crystal display (LCD), a general flat display system and a projective type display system, enormous expenses are required to improve a display resolution. To obtain a two times resolution in a display system having a same size using the display system conventionally developed can be applied to a variety of fields. According to a prior method (Spectroscopic display system, WO2005/069269 A1, Jul. 28, 2005), it is possible to include each pixel information depending on both polarization states orthogonal to each other in one pixel, using two LCD display systems having same resolution and size and a polarizer. This method can provide a three-dimensional image without decreasing the resolution of a conventional LCD in the stereoscopic three-dimensional display system or parallax barrier manner of three-dimensional display method (Proc. SPIE 2006, 136, Paul Kleinberger et al., (2003)).

However, according to the method, when providing a two-dimensional image, only the conventional resolution can be provided. Accordingly, it is required a method capable of solving the disadvantage and thus being applied to a three-dimensional image display device and to a high resolution two-dimensional image providing system. In addition, in the conventional method, the prior system should be changed so as to see a two-dimensional image while using the three-dimensional image display method of the parallax barrier or polarizing stereoscopic manner. If such inconvenience is removed, it is possible to provide a combined two and three-dimensional display system having a higher utilization. In addition, in case of an application to the three-dimensional image display system of the parallax barrier manner, which is a conventional method (Proc. SPIE 2006, 136, Paul Kleinberger et al., (2003)), only the two view points can be principally provided, so that the utilization thereof is limited. If the limitation can be solved to provide a system capable of providing more view points, the utilization can be improved.

SUMMARY OF THE INVENTION

Accordingly, the present invention has been made to solve the above problems. An object of the invention is to further apply a polarizer and a display panel of a same resolution, such as LCD, to the conventional display means and to apply a polarizer capable of exhibiting two polarization states orthogonal to each other to respective pixels of the display panel applied, thereby achieving a resolution twice as high as the conventional display resolution, without developing an expensive high-resolution display system. In the mean time, as described above, the polarizer capable of exhibiting two polarization states orthogonal to each other can be used as a phase retarding device.

Another object of the invention is to provide an image display system capable of being switched to a two-dimensional display system or a stereoscopic or autostereoscopic three-dimensional image display system.

Still another object of the invention is to provide two times resolution of the conventional display system when the two-dimensional display system is used, and when switching to the three-dimensional display system, in case of the stereoscopic or autostereoscopic two view points, to provide a unit view point resolution of a three-dimensional image as it is without decreasing the resolution of the conventional display system, and in case of applying to the multi-view points three-dimensional image display system, to provide two times multi-view points of the conventional multi-view points without decreasing the unit view point resolution of the three-dimensional image.

In order to achieve the above objects, a display system according to an embodiment of the invention further applies a polarizer having a size of dividing a unit pixel of a flat display using a polarization principle, which is a flat display system further applied to a conventional display system using polarization, such as LCD, and having pixels, each of which having polarization states orthogonal to each other, thereby realizing two times resolution with a same size as an initial display system. In addition, the display system according to an embodiment of the invention can be applied to stereoscopic and autostereoscopic three-dimensional image display systems and can be used to switch a two-dimensional image display of two times resolution and the stereoscopic and autostereoscopic three-dimensional image display systems.

According to the invention, there is provided a display system for displaying two-dimensional and three-dimensional images, which comprises: display means; a first polarizer located at a distance from a front surface of the display means; a display panel provided to a front of the first polarizer and regulating a polarization direction of light having passed through the first polarizer; and a second polarizer located at a distance from a front surface of the display panel, wherein each pixel of the second polarizer has a size of dividing a unit pixel of the display panel into two parts and two polarization states of each pixel are orthogonal to each other.

Like this, it is possible to further apply a display system using the polarization, such as LCD of a same resolution, to the general display means, thereby improving the resolution by two times, as compared to a conventional two-dimensional display system.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 1:
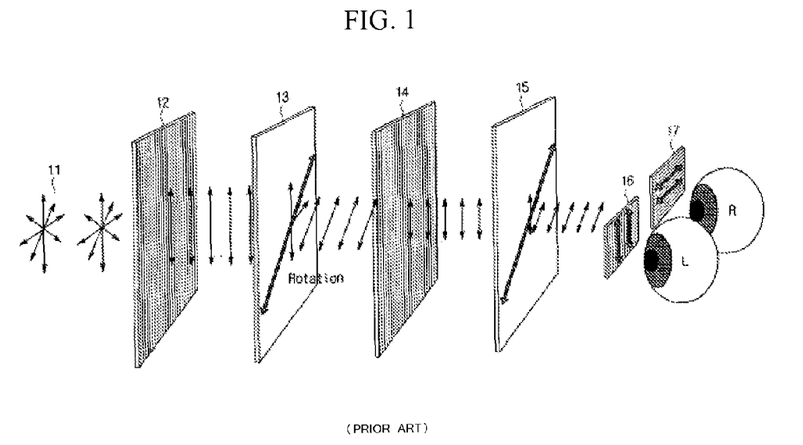
FIG. 1 shows an operation principle of an image display system according to the prior art.
Figure 2:
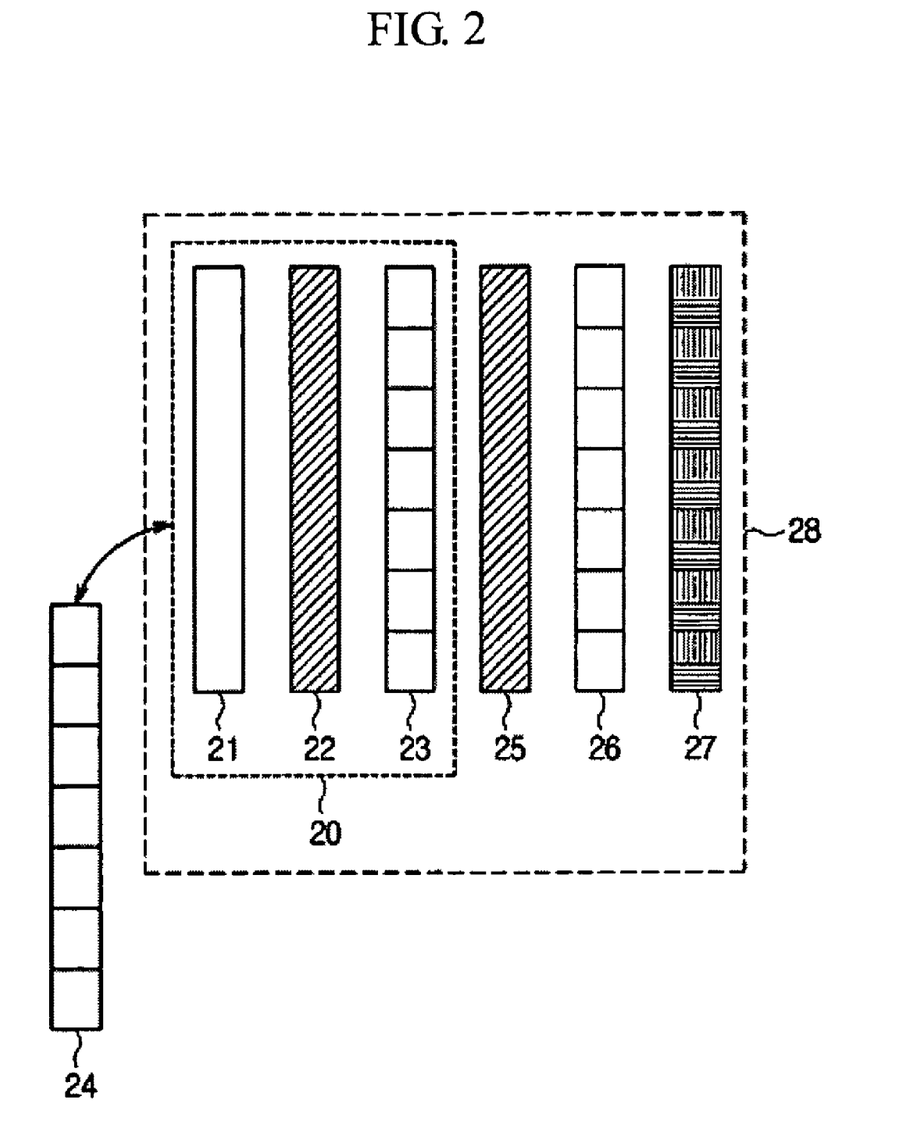
FIG. 2 shows a display system for improving a display resolution by two times, according to an embodiment of the invention.

FIG. 2 shows a structure of a display system capable of improving a display resolution by two times, according to an embodiment of the invention. The display system in FIG. 2 comprises display means 20 consisting of a polarizer 22 through which light from a light source 21 passes and a display panel 23. According to another embodiment of the invention, the display means 20 may consist of a display system using polarization, such as LCD and another two-dimensional display system 24. A general two-dimensional display system 24 applied to the structure may include all conventional two-dimensional display systems, for example a projective type display system, a diffusing screen, a CRT (Cathode-Ray Tube), a PDP (Plasma Display Panel), an organic EL (Electro-Luminescence) display system, a LED display system and the like.

A first polarizer 25 is located at a distance from a first surface of the display means 20. The first polarizer 25 serves to regulate a magnitude of light having passed through the display means 20, and passes the light having been regulated into a desired magnitude, depending on polarization states thereof.

The light having passed through the first polarizer 25 passes through a display panel 26 located at a distance from a front surface of the first polarizer 25. A display panel using the polarization, such as LCD, can be used as the display panel 26.

According to an embodiment of the invention, when the light having passed through the first polarizer 25 passes through the display panel 26, the polarization direction thereof is regulated so that the light can be distributed to desired magnitudes in x-axis and y-axis directions of an orthogonal coordinate with the magnitude of the light being regulated to be constant. Then, an image having the quantity of the light, which has been regulated with the polarization directions, is displayed. Accordingly, it is possible to further apply the display panel 26, such as LCD, having same pixel size and resolution as the display panel 23 of the display means 20, thereby generating an output of two linearly, circularly or elliptically polarized lights orthogonal to each other and having the two pixel information in one pixel.

A second polarizer 27 is further located at a distance from a front surface of the display panel 26. The second polarizer 27 uses linear polarizers or phase retarding devices generating two linearly, circularly or elliptically polarized light states orthogonal to each other in one pixel. At this time, in case of using the linearly polarized light characteristic, the second polarizer 27 is of a linear polarizer manner, and in case of using the circularly and elliptically polarized lights, the second polarizer 27 is used in a manner combining the linear polarizer manner and the phase retarding device manner.

As shown in FIG. 2, the second polarizer 27 is manufactured to include two orthogonal polarization devices in one pixel size of the display panel 23 of the display means 20 or the display panel 26 used as the LCD. In other words, each pixel of the second polarizer 27 has a size of dividing a unit pixel of the display panel 23 of the display means 20 or the display panel 26 used as LCD into two parts and the two polarization states of each pixel becomes orthogonal to each other.

Like this, the display means 20, the first polarizer 25, the display panel 26 and the second polarizer 27 are constituted, thereby realizing two times resolution of the two-dimensional display system.

Figure 3:
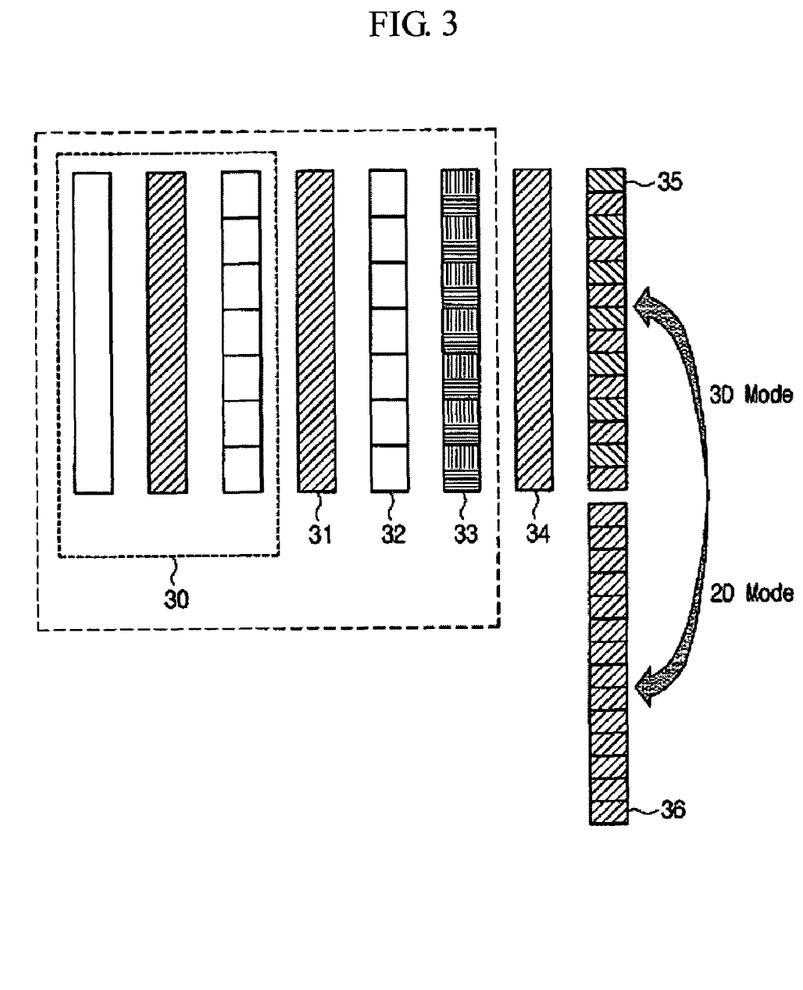
FIG. 3 shows a three-dimensional image display system using a parallax barrier manner according to an embodiment of the invention, and shows that the three-dimensional image display system is switched to the two-dimensional image display system.

FIG. 3 shows a three-dimensional image display system using the parallax barrier manner, according to an embodiment of the invention, and shows that the three-dimensional image display system is switched to the two-dimensional image display system. The three-dimensional image display system in FIG. 3 has such a structure that a third polarizer 34 of a single polarization state is further provided to the display system 28 of FIG. 2 and a fourth polarizer 35 located at a distance from a front surface of the third polarizer 34 and forming a parallax barrier is provided.

With such structure, a linear polarizer, circular polarizer or elliptical polarizer can be used as the third polarizer 34. In addition, the fourth polarizer 35 has two polarization states of two directions, one of which being same as the polarization state of the third polarizer 34 and the other being orthogonal thereto, and arranges linear polarization devices, circular polarization devices or elliptical polarization devices into desired size and order. In other words, according to an embodiment of the invention, the fourth polarizer 35 has pixels, each of which having same size as the pixel of the second polarizer 33, and has such a structure that the polarization states of the two directions, one of which being same as the polarization state of the third polarizer 34 and the other being orthogonal thereto, are exhibited alternately and repeatedly at each pixel. Thereby, it serves as the parallax barrier.

In addition, according to an embodiment of the invention, as described above, the fourth polarizer 35, in which the polarization states of the two directions, one of which being same as the polarization state of the third polarizer 34 and the other being orthogonal thereto, are exhibited alternately and repeatedly at each pixel, is further provided. As a result, the display system of the invention can be also used as an autostereoscopic three-dimensional image display system mode using the parallax barrier manner. Additionally, the polarization state of the fourth polarizer 35 is changed to be same as the polarization state of the third polarizer 34, so that the display system of the invention can be also switched and used into a two-dimensional image display system mode having two times resolution of the conventional display system. Like this, it is possible to easily switch and use the display system into an autostereoscopic three-dimensional image display system mode using the parallax barrier manner or a two-dimensional image display system mode having two times resolution of the conventional display system, respectively.

This method enables the two polarization states orthogonal to each other to be used to manufacture an autostereoscopic three-dimensional image display system of a multi-view points parallax barrier manner having two view points or more. In addition, the display system having the resolution increased by two times can be applied to another conventional method for displaying a three-dimensional image.

Figure 4:
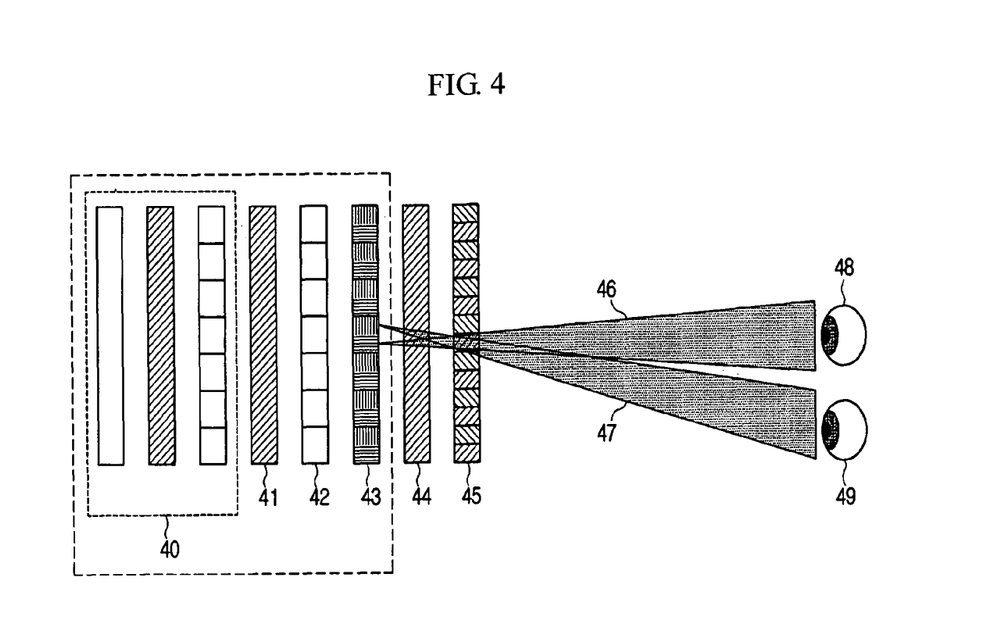
FIG. 4 shows a principle of forming view areas of two view points in the three-dimensional image display of the parallax barrier manner in FIG. 3, according to an embodiment of the invention.

FIG. 4 shows an autostereoscopic two-view points three-dimensional display device which is embodied through the parallax barrier manner using the principle of FIG. 3. In FIG. 4, view areas 46, 47 are spatially formed to provide different images to right and left eyes 48, 49, respectively.

In other words, the parallax barrier manner is used through such structure, so that an image having passed through a vertical stripe polarization 43, which will be incident on the left eye 49, and an image having passed through a horizontal stripe polarization 43, which will be incident on the right eye 48, are distributed by the fourth polarizer 45 serving as a parallax barrier. Then, the images of different view points are seen by the left and right eyes 49, 48 through the view areas 46, 47 spatially formed. As a result, a three-dimensional image is displayed. This parallax barrier manner can be also applied to multi-view points of three view points or more.

Figure 5A:
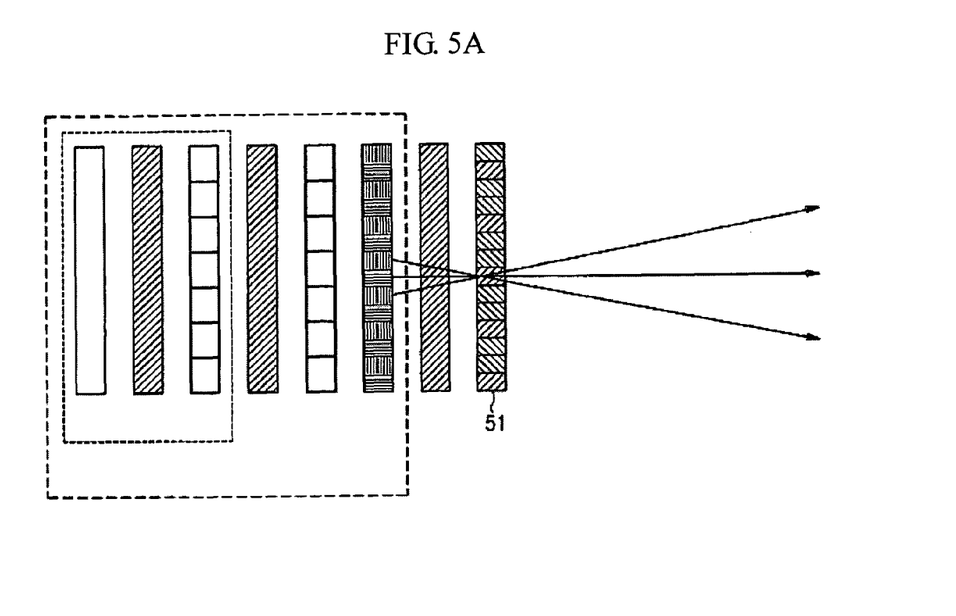
FIG. 5A shows a principle of forming view areas of three view points in the three-dimensional image display of the parallax barrier manner in FIG. 3, according to an embodiment of the invention.
Figure 5B:
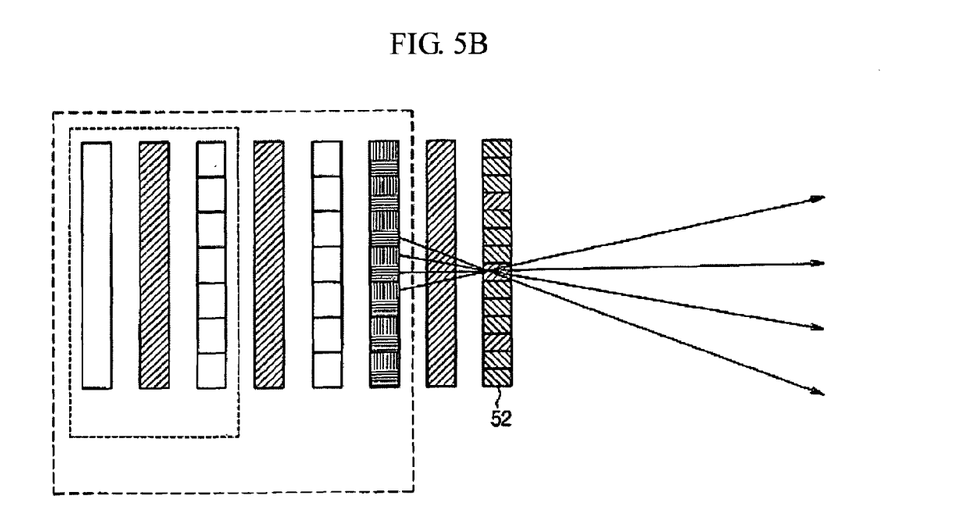
FIG. 5B shows a principle of forming view areas of four view points in the three-dimensional image display of the parallax barrier manner in FIG. 3, according to an embodiment of the invention.

FIGS. 5A and 5B show display systems forming view areas of multi-view points with the parallax barrier manner, according to an embodiment of the invention. As shown in FIGS. 5A and 5B, in the fourth polarizers 51, 52 forming a parallax barrier, one of the two polarization state orthogonal to each other is continuously exhibited depending on desired number of the view points, and the other is alternately exhibited with the polarization continuously exhibited, thereby forming the view areas of multi-view points.

Referring to each pixel of the fourth polarizer 51 in FIG. 5A, the polarized light of the same direction as the polarization state of the third polarizer 34 is exhibited at one pixel and the polarized light of the direction orthogonal to the polarization state of the third polarizer 34 is exhibited at the two continuous pixels. Like this, the pixels having the polarized lights of the two directions orthogonal to each other are alternately repeated, so that the display system of the invention can be used as the three-dimensional image display system of the three view points.

In addition, referring to each pixel of the fourth polarizer 52 in FIG. 5B, the polarized light of the same direction as the polarization state of the third polarizer 34 is exhibited at one pixel and the polarized light of the direction orthogonal to the polarization state of the third polarizer 34 is exhibited at the three continuous pixels. Like this, the pixels having the polarized lights of the two directions orthogonal to each other are alternately repeated, so that the display system of the invention can be used as the three-dimensional image display system of the four view points.

Like this, the number of the view points is increased, so that the display system can be used in more diverse manners.

As described above, by applying the display means, the first polarizer, the display panel and the second polarizer in which each pixel has a size of dividing the unit pixel of the display panel into two parts and the two polarization states of each pixel are orthogonal to each other, it is possible to manufacture a display system of the resolution increased by two times, as compared to that of the conventional display system.

When developing a high resolution two-dimensional image display system requiring enormous development costs, the present method of improving the resolution enables the high resolution and high definition display system to be inexpensively manufactured using the two types of display systems. Further, according to the invention, it is possible to provide a three-dimensional image without decreasing the resolution of the display system used to be applied to the stereoscopic and autostereoscopic three-dimensional display system of the two view points. In addition, in the three-dimensional image display system of the multi-view points more than two view points, it is possible to provide the multi-view points twice as many as the conventional multi-view points, without decreasing the unit view point resolution of the three-dimensional image.

Additionally, the display system of the invention can be easily switched and used to the autostereoscopic three-dimensional image display system mode using the parallax barrier manner or the two-dimensional image display system mode having two times resolution of the conventional display system.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. An image display system comprising:
   display means including a first display panel;
   a first polarizer located at a distance from a front surface of the display means;
   a second display panel provided to a front of the first polarizer;
   a second polarizer, having pixels, located at a distance from a front surface of the first display panel;
   a third polarizer located at a distance from a front surface of the second polarizer; and
   a fourth polarizer, having pixels, located at a distance from a front surface of the third polarizer, wherein the fourth polarizer has a pixel size that is the same as a pixel size of the pixels of the second polarizer,
   wherein each pixel of the second polarizer has a size of dividing a unit pixel of the display panel into two units and each pixel of the second polarizer is divided into a first unit and a second unit,
   wherein the first unit has a polarization state that is orthogonal to a polarization state of the second unit,
   wherein each pixel of the fourth polarizer is divided into a third and a fourth unit, and
   wherein the third unit has a polarization state that is orthogonal to a polarization state of the fourth unit.

2. The image display system according to claim 1, wherein the display means is display means using polarization.

3. The image display system according to claim 1 or 2, wherein the first and second polarizers are one of linearly, circularly and elliptically polarized lights.

4. The image display system according to claim 1, wherein the display means is one of a projective type display system, a diffusing screen, a CRT (Cathode-Ray Tube), a PDP (Plasma Display Panel), an organic EL (Electro-Luminescence) display system and a LED display system.

5. The image display system according to claim 1, wherein the polarization states of each pixel of the fourth polarizer are switched into same directions as those of the third polarizer to be applied to a two-dimensional image display system.

6. The image display system according to claim 1,
wherein at least one of the third and fourth units orthogonal to a polarization direction of the third polarizer, among the third unit and the fourth units having two polarization states orthogonal to each other in the fourth polarizer, are continuously arranged and one unit of the fourth polarizer parallel to the polarization direction of the third polarizer is arranged to follow the third and fourth units continuously arranged, so that an arrangement of the third and fourth units having a same shape in the fourth polarizer is repeated at each of multi-view points desired to form, thereby forming view areas of the multi-view points, and
wherein the number of the units continuously arranged in the fourth polarizer is smaller by one than that of the multi-view points desired to form.

* * * * *